United States Patent [19]

Richards et al.

[11] E Re. 29,715

[45] Reissued Aug. 1, 1978

[54] FLUIDIC AUTOMATIC NOZZLE

[75] Inventors: George B. Richards, 1212 Ranch Rd., Lake Forest, Ill. 60045; Leonard W. Swain; Edward W. Hunter, both of London, Canada

[73] Assignee: George B. Richards, Lake Forest, Ill.

[21] Appl. No.: 769,101

[22] Filed: Feb. 16, 1977

Related U.S. Patent Documents

Reissue of:

[64] Patent No.: 3,866,637
Issued: Feb. 18, 1975
Appl. No.: 329,226
Filed: Feb. 2, 1973

[51] Int. Cl.[2] ..... B65B 3/26

[52] U.S. Cl. ..... 141/226

[58] Field of Search ..... 141/44, 46, 52, 59, 141/128, 192–229, 301, 302, 308, 309, 367, 392, 291, 292, 293, 294, 295, DIG. 1, DIG. 2; 137/81.5

[56] References Cited

U.S. PATENT DOCUMENTS

| | | | |
|---|---|---|---|
| 2,310,63 | 2/1943 | Hansen | 141/215 |
| 2,841,191 | 7/1958 | Fraser | 141/209 |
| 2,851,065 | 9/1958 | Klikunas et al. | 141/209 |
| 2,867,249 | 1/1959 | Denunger | 141/208 |
| 3,590,890 | 7/1971 | Young | 141/192 |
| 3,703,907 | 11/1972 | Richards | 137/81.5 |

*Primary Examiner*—Houston S. Bell
*Attorney, Agent, or Firm*—Gerald D. Hosier

[57] ABSTRACT

A nozzle for use in controlling the flow of liquids incorporating a positive pressure generating device which provides a positive pressure to a diaphragm chamber which serves to retain the valve in an open position after manual opening of the valve by means of a manually operable actuator mechanism. The valve actuator mechanism includes closure means for moving the valve closure means to a closed position and releasable opening means for moving the valve closure means to an open position. A releasable opening means is released when the diaphragm chamber is positively pressurized at a pressure sufficient to retain the valve closure means in a predetermined open position. This provides a nozzle which, after initial manual opening, will be automatically closed when the positive pressure provided by the positive pressure generating device is cut off by the rising level of liquid within the tank. The valve may also be closed at any time by releasing the control handle and permitting it to return to its closed position.

17 Claims, 3 Drawing Figures

FLUIDIC AUTOMATIC NOZZLE

Figures 1, 2, 3:
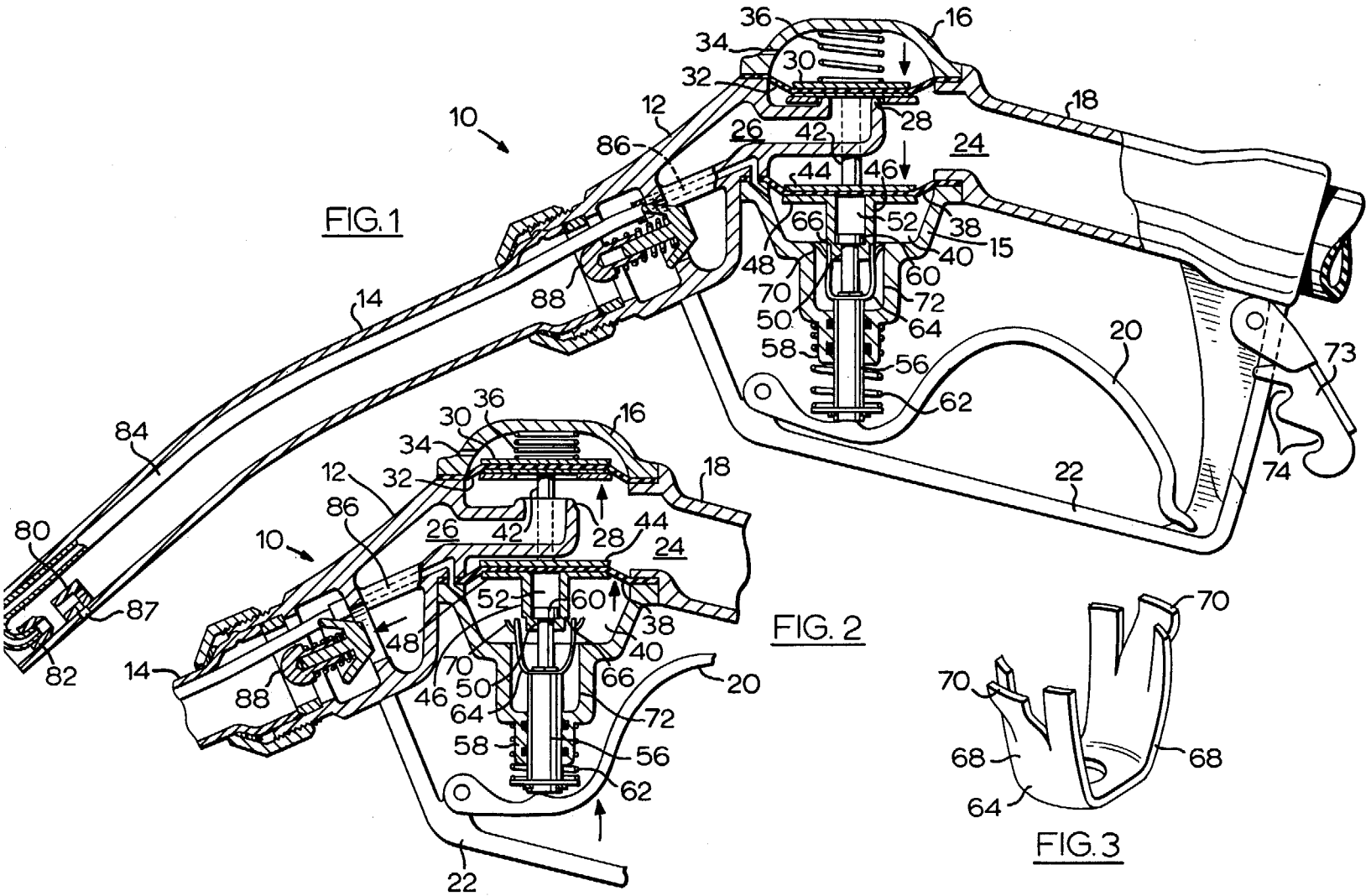

Matter enclosed in heavy brackets [ ] appears in the original patent but forms no part of this reissue specification; matter printed in italics indicates the additions made by reissue.

FIELD OF INVENTION

This invention relates to nozzles and in particular to nozzles of the type used to control the flow of liquid such as liquid fuels. The nozzle of the present invention is particularly useful in an application such as self-service gasoline retail outlets because of its automatic shut-off characteristics.

In many filling devices used for controlling the flow of liquid such as the flow of fuel into storage tanks, it is common practice to provide a liquid level control shut-off device so that when the level of liquid in the tank rises above a predetermined level the flow of liquid into the tank will be cut off. In the known devices when the level of the liquid in the tank rises above the end of the filling tube of the nozzle, it closes a vent opening in the nozzle which causes a vacuum drawn by the flow of liquid through the nozzle to close the control valve of the nozzle. Fluidic devices such as fluidic amplifiers have been known for some time. However, these devices have not been successfully incorporated into liquid filling nozzles and employed to control the level at which the flow of liquid through the nozzle is cut off. The fluidic devices have the advantage that they may be operated within the confines of a liquid storage tank regardless of the atmospheric pressure in the tank.

The present invention provides an apparatus which successfully incorporates a positive pressure generating device as a source of positive pressure for controlling the operation of an automatic shut-off nozzle of the type suitable for use in controlling the flow of fluid such as gasoline or the like.

SUMMARY

The nozzle for use in controlling the flow of liquids according to an embodiment of the present invention includes a manually operable valve actuator mechanism which mechanically engages the valve closure means when the valve closure means is in the closed position. The mechanical engagement between the valve closure means and the valve actuator mechanism permits the valve closure means to be manually moved to a second open position. The mechanical engagement is released when the diaphragm chamber of the nozzle is positively pressurized at a pressure sufficient to retain the valve closure means in an open position, thereafter the valve closure means is movable to the closed position in response to a predetermined decrease in positive pressure in the diaphragm chamber regardless of the position of the manual closure means. The valve closure means is also moved to a closed position when the actuator means is returned to its inoperative position.

According to a further embodiment of the present invention, the nozzle employs a positive pressure fluidic device mounted within the output passage thereof to provide a positive pressure in said diaphragm chamber when liquid is flowing through said output passage.

PREFERRED EMBODIMENT

The invention will be more clearly understood after reference to the following detailed specification read in conjunction with the drawing wherein FIG. 1 is a partially sectioned side view of the nozzle according to an embodiment of the present invention;

FIG. 2 is a partially sectioned view of the valve mechanism of FIG. 1 shown in the open position; and FIG. 3 is a detailed pictorial view of the spring clip used for retaining the valve actuator stem in the extended position.

With reference to the drawings, the reference numeral 10 refers generally to a nozzle of the type used to control the flow of liquid fuel such as gasoline into fuel storage tanks such as the gasoline tanks of automobiles. The nozzle consists of a body portion 12 and a filling tube portion 14. The body portion 12 includes top cover 16, stem housing 15, handle portion 18, hand lever 20 and guard 22, the nozzle has an input passage 24 and an output passage 26. A valve closure member 30 is mounted on a diaphragm 32 which is clamped between the body 12 and top cover 16. A vent passage 34 opens outwardly from the chamber which is formed above the diaphragm 32. A compression spring 36 is positioned between the valve closure member 30 and the upper wall of the top cover. Spring 36 applies a closing force to the valve closure member 30 which urges the valve closure member in a direction towards the valve seat 28.

A second diaphragm 38 is mounted in the stem housing portion 15 and separates the fluid input portion of the valve housing from a positive pressure diaphragm chamber 40. The valve closure member 30 is connected to the second diaphragm 38 by way of a pair connecting rods 42 one of which is arranged on either side of valve seat 28, the lower end of each rod 42 being connected to diaphragm plate 44. A diaphragm stem portion 46 projects into the diaphragm chamber 40 from a diaphragm plate 48 and is formed with an output passage 50 which opens outwardly from an enlarged interior chamber 52. A handle stem 56 is mounted to reciprocate within the lower end of the stem housing 15 and includes a head portion 60 reciprocally mounted within the chamber 52 of the diaphragm stem 46. A compression spring 62 normally urges the handle stem 56 into engagement with the handle 20.

A spring clip 64 has one end rigidly secured to the stem 56 with the other ends thereof extending upwardly in a direction towards the diaphragm stem. The diaphragm stem 46 has an annular shoulder 66 projecting radially therefrom. Each of the legs 68 of the spring 64 (FIG. 3) has a narrow tongue 70 projecting outwardly therefrom. The upper edges of the legs 68 are formed with a curvature conforming to the curvature of the stem of the diaphragm support. In use, the lip 70 projects outwardly a sufficient distance to bear against the inner wall 72 of the stem housing 15 when the legs are in a position underlying the plane of the shoulder portion 66 of the diaphragm stem.

The handle 20 is pivotally mounted at its forward end and a hold open clip 73 is pivotally mounted for movement to a position in which one or other of the recesses 74 serve to retain the free end of the hand lever 20 in an elevated position. The clip 73 is spring biased in a direction away from the handle 20 so that if the nozzle falls when the handle is in the open position, the shock on impact will be sufficient to release the clip 73 and the spring bias will move the clip 73 away from the hand lever and the hand lever will then return to the closed position under the influence of the compression spring 62.

The device used for generating the positive pressure consists of a fluid stream generating device 80 which has a passage therein axially aligned with a receiver 82. The passage in the receiver 82 is connected to a conduit 84 which communicates with a passage 86 which opens into the diaphragm chamber 40. A level sensing passage 87 opens through the wall of the filling tube into the through passage of the stream generating device 80. A conventional one-way check valve 88 is mounted adjacent the upper end of the filling tube 14 so as to prevent drainage of the liquid which is trapped within the hose leading to the nozzle.

When the nozzle of the present invention is in a storage position, the various elements are arranged in the configuration shown in FIG. 1 of the drawings. When the nozzle is to be used, the lever 20 is manually engaged and moved towards the handle portion 18. The lever 20 mechanically elevates the handle stem 56 which, by reason of the fact that the spring clip 64 engages the shoulder 66, raises the lower diaphragm and the valve closure member 30 to permit fluid to pass from the passageway 24 to the passage 26. The extent to which the valve can be manually open is limited to the point at which the lugs 70 of the spring clip 64 are elevated above the wall portion 72 of the canopy, when the spring clip 64 is raised to a position wherein the lugs 70 are above the level of the wall 72 of the stem housing 15, the legs 68 of the spring clip move outwardly causing the spring to become disengaged from the shoulder 66. The initial mechanical opening of the valve is enough to establish a sufficient flow within the filling tube portion to provide a positive pressure at positive pressure generating device which is directed by way of the conduit 84 into the diaphragm chamber 40. The pressure within the chamber 40 at the point where mechanical operation of the valve, by means of the spring clip, is terminated is sufficient to retain the valve in the open position. The pressure in the diaphragm chamber 40 gives the valve a self opening bias against the head 60 resulting in the ability to control the degree of opening by manually manipulating the handle up to a fully open condition. At this time the handle 20 can be locked in position by locating the free end of the handle in one of the notches 74 of the spring clip 73.

Liquid will continue to flow through the valve until the vent passage 87 is submerged. As soon as the vent passage 87 is submerged, there is an immediate drip in pressure in the fluid supplied to the diaphragm chamber 40. When the pressure within the chamber 40 drops, the spring 36 will cause the valve closure member to move to the closed position. The value closure member 30 will move to the closed position regardless of the position of the control lever 20 and the valve stem 56. This is possible by reason of the fact that the head 60 of the valve stem 56 is free to slide within the chamber 52 formed within the diaphragm stem. Furthermore, because the spring arms 68 are allowed to spring freely outwardly when the valve is open, they do not interfere with the movement of the lower diaphragm stem. In order to top off the tank which is being filled, it is necessary to release the locking clip 73 and permit the lever 20 to move to the closed position under the influence of the spring 62. This causes the head 60 of the handle stem 56 to be withdrawn within the chamber 52 and it also causes the spring 64 to be withdrawn relative to the diaphragm stem 46. The lugs 70 of the spring 64 will again engage the side walls 72 of the stem housing 15 of the diaphragm chamber and this will force the arms 68 inwardly so that, as soon as the upper ends of the arms 68 pass below the level of the shoulder 66, the spring 64 will engage the shoulder 66 so that mechanical opening of the valve can then be achieved. The valve may then be opened mechanically as previously described limiting the extent of opening to that sufficient to provide the restricted flow required for topping off purposes.

It will also be noted that the valve may be closed at any time by releasing the handle 20 and allowing it to return to the closed position under the influence of spring 62. The spring 62 is sufficiently strong to exhaust the diaphragm chamber 40 and mechanically lower the diaphragm 38.

From the foregoing description of the present invention, it will be apparent that the applicant has successfully incorporated the positive pressure provided by the fluidic amplifier into a nozzle which is suitable for use in controlling the flow of fluid such as gasoline.

What we claim as our invention is:

1. In an automatic nozzle for use in controlling the flow of fluids having a housing having a fluid passage opening therethrough, valve means in said passage including a valve member for opening and closing said fluid passage, and means for generating a positive fluid pressure in response to the flow of liquid through said fluid passage, diaphragm means mounted in said housing forming a diaphragm chamber communicating with said means for generating a positive pressure, said means for generating a positive pressure including means for disrupting its pressure generating ability in response to the level of liquid in the tank being filled rising above a predetermined height with respect to said nozzle, manually operable valve opening means movable between a first position in which said valve member is closed and a second position in which said valve is open, the improvement of means connecting said diaphragm means and said valve means whereby said valve means moves with said diaphragm, and wherein said manually operable actuator means includes collapsible stem means extending into said housing and engaging said diaphragm means, locking means for releasably locking said stem means in an extended position in which said stem is operable to move said diaphragm to move said valve member to an open position, and means urging said stem means to said first position to close said valve, said releasable locking means being released when said stem means is moved to a predetermined position at least partially opening said valve and when said diaphragm chamber is positively pressurized at a pressure sufficient to move said valve closure member independently of said stem, thereafter said valve closure means being closable in response to a predetermined decrease in pressure by collapsing of said stem.

2. A nozzle as claimed in claim 1 wherein said collapsible stem means includes a diaphragm stem portion projection from said diaphragm and a handle stem portion having one end slidably mounted with respect to said diaphragm stem portion and spring clip means carried by one of said stem portions and movable between a first position engaging the other of said stem portions and retaining the stem in the extended position and a second position out of engagement with the other of said stem portions to permit said stem to contract.

3. A nozzle as claimed in claim 2 wherein said diaphragm stem portion and said handle stem portion telescopically engage one another within said diaphragm chamber, said spring clip means engaging a wall of said diaphragm chamber when said handle stem portion moves to its outermost position with respect to said diaphragm chamber so as to urge said spring clip in a direction towards said diaphragm stem to engage said diaphragm stem when said diaphragm stem and said handle stem are in said extended configuration.

4. A nozzle as claimed in claim 1 wherein said valve actuator means includes manually engageable handle means movable between the first closed position and the second open position and means for locking said handle in said second open position.

*5. A fluidic nozzle for controlling the flow into a storage tank, comprising:*

*nozzle housing means having a fluid inlet passage, a fluid outlet passage for insertion into said storage tank and an intermediate fluid passage interconnecting said inlet and outlet passages;*

*valve means including a valve member and valve seat in the fluid flow path of said intermediate fluid passage for opening said intermediate fluid passage in response to an applied positive pressure of a predetermined value and for closing said intermediate fluid passage in the absence of said positive pressure;*

*valve actuator means for operating said valve means to apply said predetermined positive pressure to said valve means for initially opening said intermediate passage to permit fluid flow through said housing means passages into said storage tank;*

*fluidic means having an output and responsive to fluid flow in said housing means outlet passage for normally generating a positive fluid pressure signal of at least said predetermined value at said output and having a fluid level sensing inlet disposed in said housing means outlet passage for causing a decrease in the fluid pressure signal at said output of said amplifier means below said predetermined value when the liquid level in said storage tank rises to the level of said sensing inlet; and*

*signal applying means coupling said output of said fluidic means to said valve means for applying said predetermined value positive pressure signal to said valve means to normally maintain said intermediate fluid passage open following initial opening thereof by said actuator means until said liquid level rises to the level of said sensing inlet.*

*6. The fluidic nozzle of claim 5 in which said valve means further includes a first bias element for normally biasing said valve member against said valve seat and in which said valve actuator means includes a manually actuated handle.*

*7. The fluidic nozzle of claim 6 in which said valve means includes a second valve member cooperatively defining with said housing means a pressure chamber and in which said first valve member is coupled for movement with said second valve member and further in which said signal applying means couples said output of said fluidic means to said pressure chamber.*

*8. The fluidic nozzle of claim 7 in which said valve actuator means comprises valve stem linkage coupled between said manually actuated handle and said second valve member.*

*9. The fluidic nozzle of claim 8 in which said first and second valve means are movable diaphragms rigidly coupled to one another by connecting means.*

*10. The fluidic nozzle of claim 9 in which said valve actuator means further includes a second bias element for normally biasing said manually actuable handle in a direction to close said first valve member, and in which said first and second bias elements exert a biasing pressure to close said first valve greater than said predetermined pressure valve.*

*11. The fluidic nozzle of claim 10 in which said valve stem linkage couples said manually actuated handle to said second valve member for a predetermined distance of movement of said handle at least sufficient for opening said first valve member and initiating fluid flow through said housing passages and thereafter said valve stem linkage decouples said manually actuable handle from said second valve member.*

*12. The fluidic nozzle of claim 11 in which said first and second bias means comprise springs, said signal applying comprises a fluid conduit and in which said fluidic means comprises a fluid amplifier having an input for normally directing fluid flow entering said input to said output without a substantial reduction in fluid pressure but responsive to fluid level at said level sensing inlet for diverting said fluid flow away from said output to effect a substantial reduction in the fluid pressure signal at said output.*

*13. The fluidic nozzle of claim 12 in which one side of said second diaphragm valve member communicates with said pressure chamber and in which the opposite side thereof communicates with fluid entering said housing means inlet passage.*

*14. The fluidic nozzle of claim 13 in which said first valve member progressively restricts flow through said intermediate housing means passage in moving between its open and closed positions and in which said predetermined distance during which said valve stem linkage couples said manually actuated handle to said second diaphragm valve member is sufficient to permit manual control of fluid flow through said intermediate housing means passage at no more than a preselected, restricted fluid flow rate, independently of said fluidic means.*

*15. The fluidic nozzle of claim 14 in which said one side of said first diaphragm valve member is both coupled to said second diaphragm valve member and adapted for engaging said valve seat and in which the opposite side thereof engages said spring bias element.*

*16. The fluidic nozzle of claim 15 in which said opposite side of said first diaphragm valve member cooperates with said housing means to define a second pressure chamber and in which said second pressure chamber is vented to atmosphere.*

*17. In a nozzle for use in controlling the flow of liquids into a storage tank including a housing means having a fluid passage opening therethrough with an output end of said passage being adapted for insertion into said storage tank, a first valve member for opening and closing said fluid passage, signal means for generating a predetermined positive fluid pressure in response to the flow of liquid through said fluid passage and having means for disrupting said predetermined positive fluid pressure of said signal generating means in response to the level of liquid in said storage tank rising above a predetermined height with respect to said nozzle and manually operable valve actuator means movable between a first position in which said first valve member is closed and a second position in which said valve member is at least partially open, the improvement comprising:*

*valve means including said first valve member and a second valve member, coupled for coordinated movement with said first valve member, said second valve member cooperating with said housing means to define a pressure chamber for displacing said first valve member to its open position in response to said predetermined positive fluid pressure applied to said pressure chamber;*

*signal applying means for coupling said signal pressure of said positive signal generating means to said pressure chamber; and*

*bias means for normally maintaining said first valve member closed in the absence of operation of said valve actuator means and said predetermined positive pressure signal.*

* * * * *